(12) United States Patent
Ehsani et al.

(10) Patent No.: US 9,251,142 B2
(45) Date of Patent: *Feb. 2, 2016

(54) MOBILE SPEECH-TO-SPEECH INTERPRETATION SYSTEM

(71) Applicant: NANT HOLDINGS IP, LLC, Culver City, CA (US)

(72) Inventors: Farzad Ehsani, Sunnyvale, CA (US); Demitrios Master, Cupertino, CA (US); Elaine Drom Zuber, Cupertino, CA (US)

(73) Assignee: Nant Holdings IP, LLC, Culver City, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/326,283

(22) Filed: Jul. 8, 2014

(65) Prior Publication Data

US 2014/0316762 A1 Oct. 23, 2014

Related U.S. Application Data

(63) Continuation of application No. 13/934,194, filed on Jul. 2, 2013, now Pat. No. 8,775,181, which is a continuation of application No. 12/351,793, filed on Jan. 9, 2009, now Pat. No. 8,478,578.

(60) Provisional application No. 61/020,112, filed on Jan. 9, 2008.

(51) Int. Cl.
| *G06F 17/28* | (2006.01) |
| *G10L 15/00* | (2013.01) |
| *G10L 13/00* | (2006.01) |
| *G10L 15/26* | (2006.01) |

(52) U.S. Cl.
CPC ............ *G06F 17/2854* (2013.01); *G06F 17/28* (2013.01); *G06F 17/289* (2013.01); *G10L 13/00* (2013.01); *G10L 15/005* (2013.01); *G10L 15/26* (2013.01)

(58) Field of Classification Search
USPC .................. 704/2–10, 246, 247, 251, 252
See application file for complete search history.

(56) References Cited

U.S. PATENT DOCUMENTS

| 4,882,681 A | 11/1989 | Brotz |
| 4,885,681 A | 12/1989 | Umeno et al. |
| 5,818,733 A | 10/1998 | Hyuga |
| 5,953,693 A | 9/1999 | Sakiyama et al. |
| 5,982,853 A | 11/1999 | Liebermann |

(Continued)

*Primary Examiner* — Leonard Saint Cyr
(74) *Attorney, Agent, or Firm* — Stetina Brunda Garred & Brucker

(57) ABSTRACT

Interpretation from a first language to a second language via one or more communication devices is performed through a communication network (e.g. phone network or the internet) using a server for performing recognition and interpretation tasks, comprising the steps of: receiving an input speech utterance in a first language on a first mobile communication device; conditioning said input speech utterance; first transmitting said conditioned input speech utterance to a server; recognizing said first transmitted speech utterance to generate one or more recognition results; interpreting said recognition results to generate one or more interpretation results in an interlingua; mapping the interlingua to a second language in a first selected format; second transmitting said interpretation results in the first selected format to a second mobile communication device; and presenting said interpretation results in a second selected format on said second communication device.

23 Claims, 6 Drawing Sheets

(56) References Cited

U.S. PATENT DOCUMENTS

| | | |
|---|---|---|
| 6,088,672 A | 7/2000 | Miki |
| 6,397,267 B1 | 5/2002 | Chong, Jr. |
| 6,633,235 B1 | 10/2003 | Hsu et al. |
| 8,165,867 B1 | 4/2012 | Fish |
| 2002/0069063 A1 | 6/2002 | Buchner et al. |
| 2002/0181669 A1 | 12/2002 | Takatori et al. |
| 2003/0216919 A1 | 11/2003 | Roushar |
| 2005/0080630 A1 | 4/2005 | Mills et al. |
| 2006/0072738 A1 | 4/2006 | Louis et al. |
| 2006/0259307 A1 | 11/2006 | Sanders et al. |

MOBILE SPEECH-TO-SPEECH INTERPRETATION SYSTEM

CROSS REFERENCE

This application is a continuation of U.S. application Ser. No. 13/934,194, filed Jul. 2, 2013, now issued as U.S. Pat. No. 8,775,181, which is a continuation of U.S. application Ser. No. 12/351,793, filed Jan. 9, 2009, now issued as U.S. Pat. No. 8,478,578, which claims the benefit of U.S. Application Ser. No. 61/020,112, filed Jan. 9, 2008, all of which are incorporated herein by reference in their entirety.

FIELD OF INVENTION

The present invention relates to speech-to-speech interpretation systems, and in particular to using mobile communication devices to recognize, send, and receive speech data to a remote interpretation server.

BACKGROUND

An automatic speech-to-speech (S2S) interpreter is an electronic interpreter that enables two people who speak different natural languages to communicate with each other.

The interpreter consists of a computer, which has a graphical and/or verbal interface; one or more audio input devices to detect input speech signals, such as a receiver or microphone; and one or more audio output devices such as a speaker. The core of the interpreter is the software, which comprises three components: a speech recognizer, an interpretation engine, and an output processor.

Automatic speech recognition (ASR) can be defined as the conversion of an input speech signal into text. The text may be a "one best" recognition, an "n best" recognition, or a word-recognition lattice, with respective associated recognition confidences. The broader the domain that an ASR engine is trained to recognize, the worse the recognition results. This balance between recognition coverage and precision is a recurring theme in the field of pattern recognition and is fundamental to the assessment of each component's performance.

Interpretation is the task of providing a representation in one language to a representation in another language. This can be done through a classifier, that is, viewing interpretation as if we are classifying speech input into one of many bins, (see U.S. patent application Ser. No. 11/965,711), as well as automatic machine translation (MT). MT is the task of translating text in one natural language to another language. Machine translation is generally performed by one or more of the following broad categories: rule-based machine translation (RBMT), template based machine translation (TBMT), and statistical machine translation (SMT). A combination of these engines may be used to perform interpretation.

Speech synthesis is often accomplished using a text-to-speech (TTS) processor which handles how interpreted text is converted into sound. Systems are trained on recorded speech in the target language. Phone or word sequences are sampled and stitched together to derive the output signal.

S2S interpretation systems are subject to propagation of error. The quality of the input signal affects the quality of the speech recognition. Similarly, the quality of the recognized text directly affects the quality of the interpretation and thereby also the output of the system via a TTS processor. Additionally, each component contributes its own error. A robust S2S system is able to minimize these errors and improve the output of any one component by applying constraints from the succeeding component, thereby rendering the system robust to that error.

SUMMARY OF INVENTION

An object of the present invention is to provide interpretation methods for mobile users using one or more intermediary servers for performing recognition, interpretation, and output tasks.

Another object of the present invention is to provide interpretation results in an interlingua and mapping the interlingua to a second language.

Another object of the present invention is to provide interpretation results to the receiving communication device where the communication device presents the interpretation results in the designated format.

Interpretation from a first language to a second language via one or more communication devices is performed through a communication network (e.g. phone network or the internet) using a server for performing recognition and interpretation tasks, comprising the steps of: receiving an input speech utterance in a first language on a first mobile communication device; conditioning said input speech utterance; first transmitting said conditioned input speech utterance to a server; recognizing said first transmitted speech utterance to generate one or more recognition results; interpreting said recognition results to generate one or more interpretation results in an interlingua; mapping the interlingua to a second language in a first selected format; second transmitting said interpretation results in the first selected format to a second mobile communication device; and presenting said interpretation results in a second selected format on said second communication device.

An advantage of the present invention is that it provides interpretation methods for mobile users using one or more intermediary servers for performing recognition, interpretation, and output tasks.

Another advantage of the present invention is that it provides interpretation results in an interlingua and mapping the interlingua to a second language.

Another advantage of the present invention is that it provides interpretation results to the receiving communication device where the communication device presents the interpretation results in the designated format.

DRAWINGS

DETAILED DESCRIPTION OF THE PREFERRED EMBODIMENTS

One component of the present invention, SMINDS Mobile, is a mobile S2S interpretation system that provides an adaptable platform to enable verbal communication between speakers of different languages within the context of a specific domain. Mobile communication device users may download a client version of SMINDS Mobile in the language and domain of choice. Here, communication means any communication through analog or digital means and/or analog or digital networks (including the internet) or combinations thereof.

In addition to the hardware setup and the user interface (both graphical and voice), the SMINDS Mobile system of the present invention may utilize a client/server model in processing the data. The client side of SMINDS Mobile functions to record and transmit speech data through a gateway to a SMINDS Mobile server.

The SMINDS Mobile server can utilize a classification algorithm (see U.S. patent application Ser. No. 11/965,711) to perform interpretation, but may also utilize the core technology of the SMINDS S2S translation system (see U.S. patent application Ser. No. 11/633,859), including RBMT, TBMT, and SMT. The interpretation result is then sent back to a user with a client system.

Figure 1:
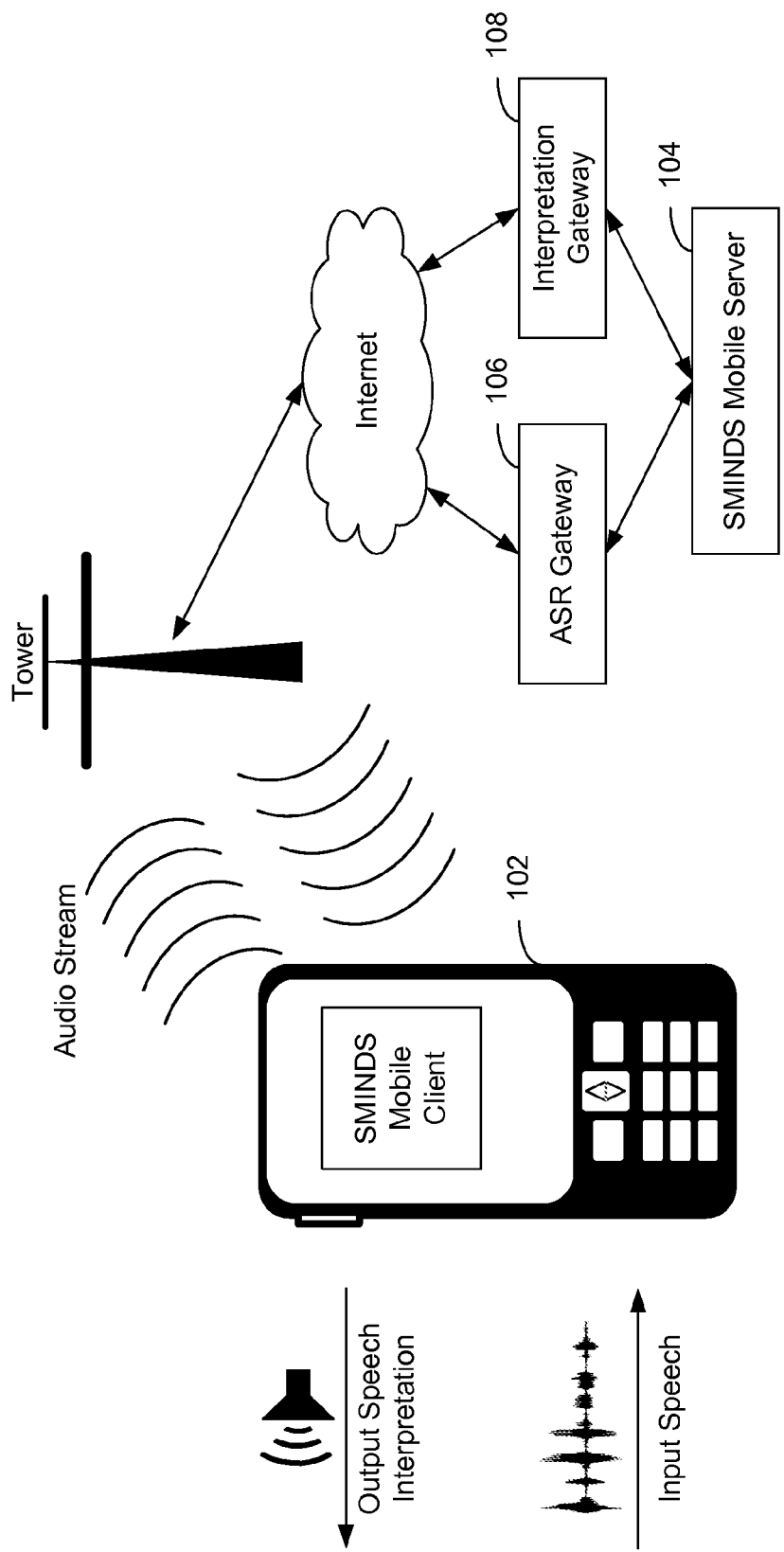
FIG. 1 illustrates a preferred embodiment of the present invention, SMINDS Mobile, and its components.

FIG. 1 illustrates a preferred embodiment of the present invention, a SMINDS Mobile system. A SMINDS Mobile client 102 transmits speech data to and retrieves speech data from a SMINDS Mobile server 104 via a network, preferably the internet, for interpretation. One or more gateways, 106 and 108, can be used to receive and transmit data to and from the client 102 and server 104. The components of the SMINDS Mobile system will be explained in further detail below.

Figure 2:
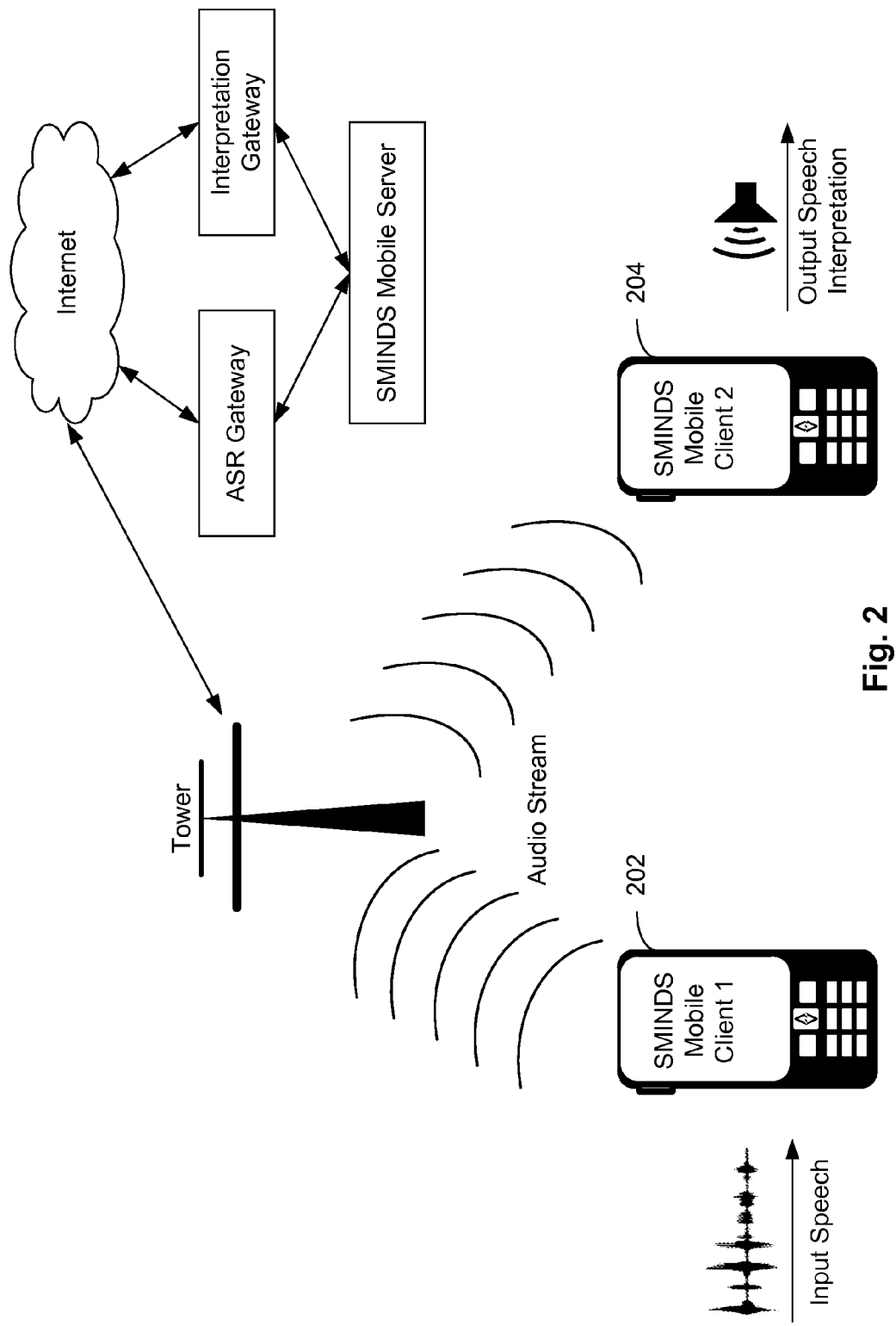
FIG. 2 illustrates a preferred embodiment of the present invention, SMINDS Mobile, with multiple mobile communication devices.

FIG. 2 illustrates a preferred embodiment of the present invention, a SMINDS Mobile system, with multiple mobile communication devices. If the users of SMINDS Mobile are not located in the same place, the interpretations and prompts can be sent to different mobile communication devices, 202 and 204. This can be accomplished through a variety of ways, such as an intermediate service (collecting data packets from all streams and retransmitting such streams as combined streams for processing), or having both mobile communication devices linked to the same interaction on the SMINDS Mobile server.

Though the speech recognition engine is not covered in this disclosure, the mobile recognition module is a key part of the system. This type of mobile ASR (also known as distributed ASR) can utilize a thin client package on a mobile communication device, which sends compressed audio to an ASR server for recognition. This thin client can be a part of the recognition package itself, and is available from various sources. Using this kind of mobile recognizer enables the embodiments of the present invention to acquire speech data on a mobile communication device and transmit it to and from a server for recognition and interpretation.

I/O Devices

At the front end of the SMINDS Mobile system is an input audio device which is responsible for receiving the voice signal. At the back end of the system is an audio output device, which is responsible for issuing system prompts or playing the output interpretation via text-to-speech conversion of a string or a pre-recorded audio file.

The physical configuration of the devices may vary, and SMINDS Mobile allows input and output from the first mobile communication device, or multiple mobile communication devices.

An example configuration is where a person speaking into the built-in microphone on a first mobile communication device or through an associated hands-free device microphone, and the output being the built-in or external speaker on the first mobile communication device or a second mobile communication device.

SMINDS Mobile Client

Figure 3:
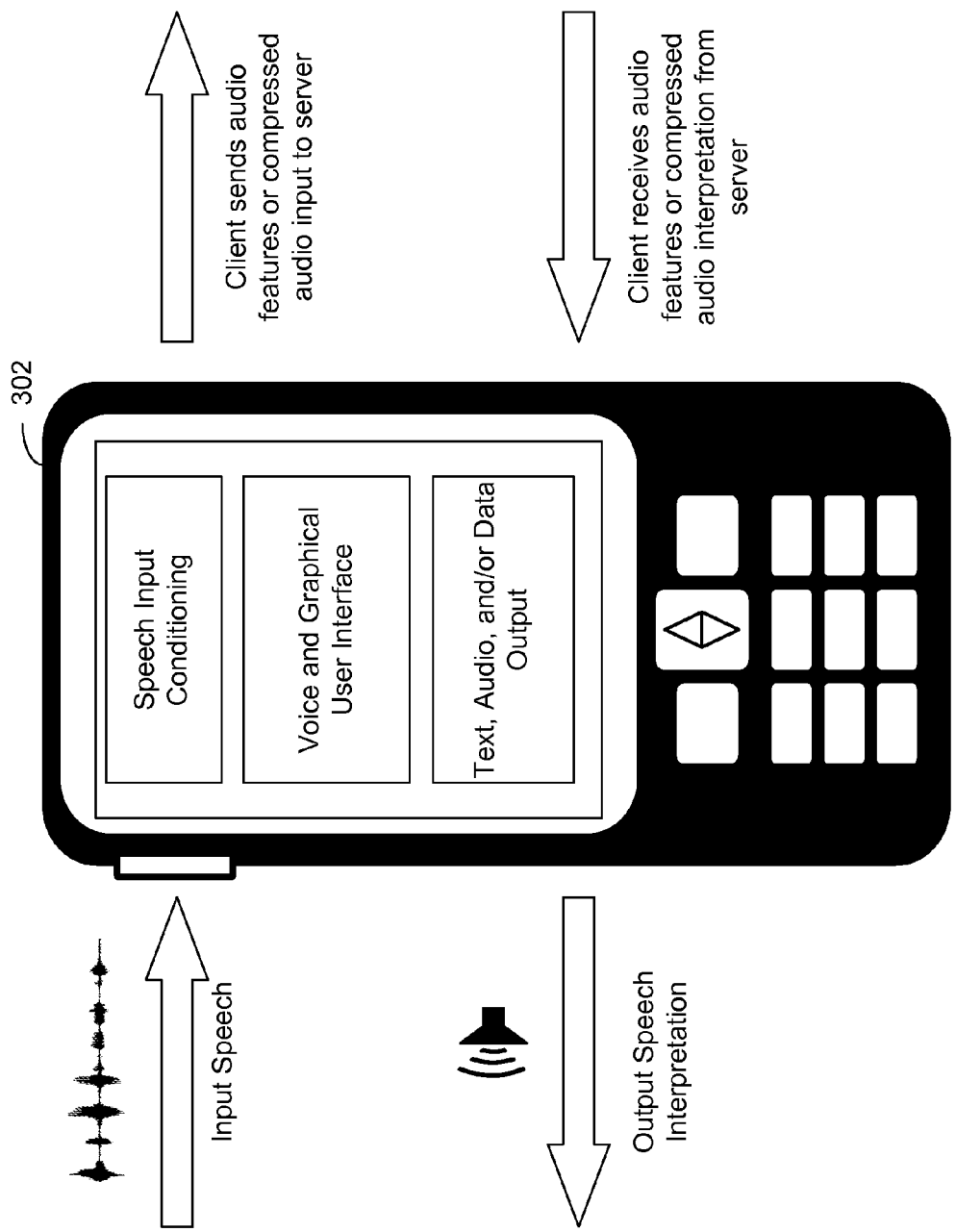
FIG. 3 illustrates a client device having a SMINDS Mobile client where the components of the client and a process flow are illustrated.

FIG. 3 illustrates a client device having a SMINDS Mobile client where the components of the client and a process flow are illustrated. In addition to the user interface, which will be described below, a SMINDS Mobile client 302 may have two primary functions. It functions first to record, compress (if necessary), feature extract (in some cases) and transmit speech data to a server, and it functions second to receive interpretation data to present to the user.

Speech Input Conditioning

In the speech conditioning process, the speech is chunked into digital packets that can be transmitted to the ASR server via a gateway. Before packetization, it is possible for the system to do one or both of the following tasks. The first task is to compress speech in order to reduce the needed bandwidth to send the speech wirelessly and/or through a digital network (including the internet) in order to speed up the process. There are standard speech compression algorithms for speech that could be used.

The second is extracting features from a speech signal. All speech recognition engines perform feature extraction based on some kind of spectral coefficient (e.g. mel frequency cepstral coefficients) on every 10-20 ms using a window of 20-30 ms. This front-end audio processing can be done with proprietary algorithms from speech recognition companies or with open standards such as AURORA. The primary reason for extracting features on the client side is to compress speech without any loss in ASR accuracy.

A SMINDS Mobile client may also support the implementation of any various third-party speech recognition engines that provide platforms for recognition on mobile communication devices. Depending on the specific requirements of the recognizer employed, the original sampling rate of the signal may be down-sampled to accommodate that recognizer.

Figure 4:
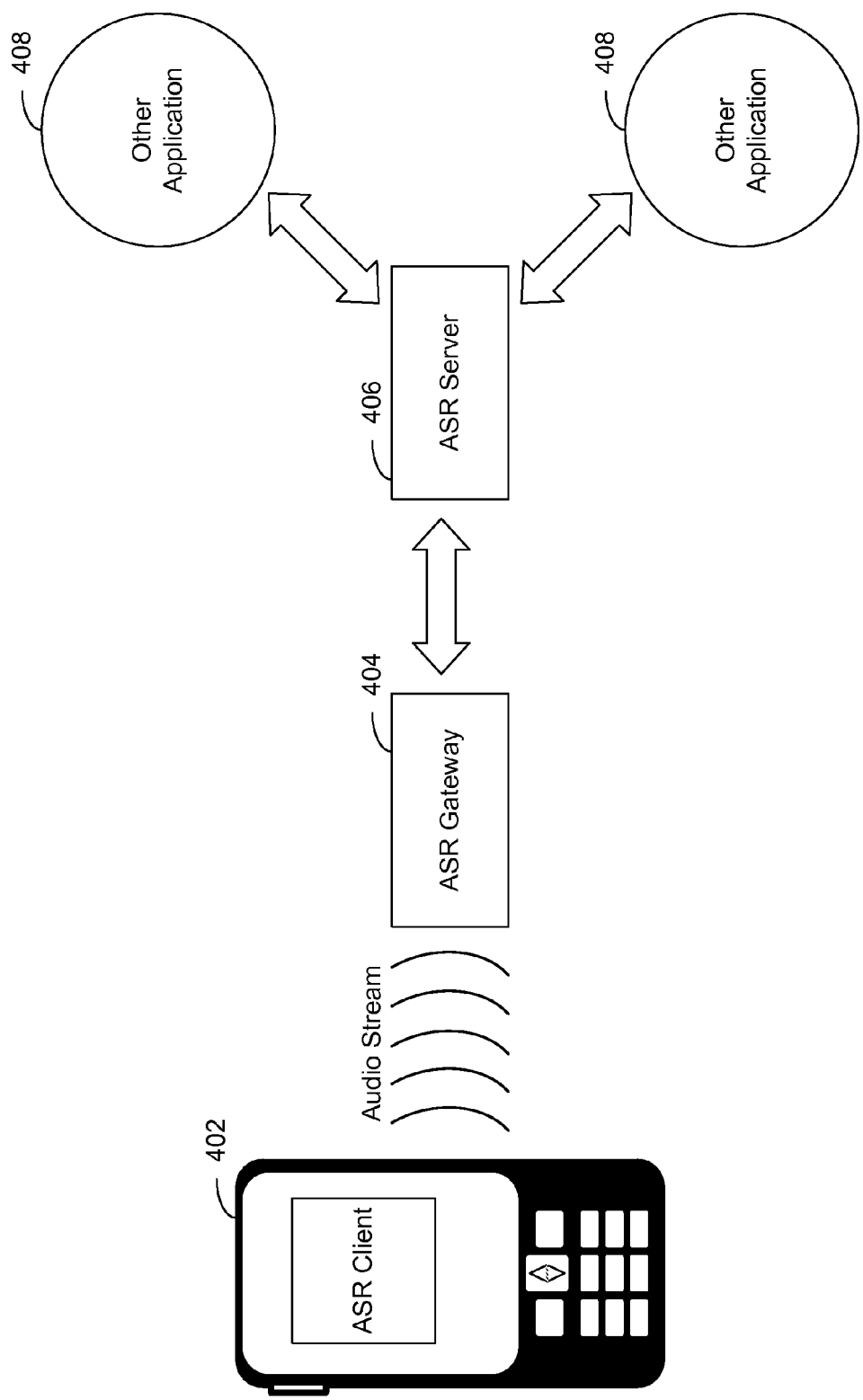
FIG. 4 illustrates a mobile ASR and related components.

FIG. 4 illustrates a mobile ASR and related components. The data, once conditioned, is transmitted from an ASR client 402 through a gateway 404 (described below) to a server 406 for recognition. The output of the recognizer can then be passed to other applications for processing 408. Alternatively, the entire speech recognition engine can reside in the mobile communication device but currently that is considered an expensive solution given the current state of mobile communication device technology.

In addition to utilizing pre-existing mobile recognition packages, the SMINDS Mobile client can also record the user's voice for further processing.

A SMINDS Mobile client also may store, send, and receive other information such as location information from the mobile communication device, user profile, domain selection, and voice adaptation data (or even voice identification data that can activate a particular model pre-trained for that voice). This information can all be transmitted to the server to aid in speech recognition, interpretation, and output form.

Audio, Text, or Data Output

A SMINDS Mobile client may also present the "interpreted" output from the SMINDS server back to the user in a visual, tactile, and/or auditory manner. It may also give a rank of the top n ASR results back to the user for selection for improved accuracy. Other types of feedback may also be presented to the user.

The SMINDS Mobile client may contain an embedded TTS engine or a video clip library if the output from the SMINDS server is limited to text. This can improve the speed of the interaction, but it may reduce the quality of the output speech or video.

SMINDS Mobile Gateway

In order to receive and transmit data to and from the client and server, SMINDS Mobile may utilize a gateway. This gateway is a server that stores information and is accessed remotely by the client through a data connection. The data connection will allow the client to send input information to the gateway and retrieve interpreted output information. This data connection could be similar to data plans offered by mobile communication device providers.

The gateway may be made up of one or more sites (e.g. web locations). The first site may be limited to an ASR gateway, receiving speech data from the client and allowing the server to retrieve it. The second site may receive interpretation results or feedback from the server and allow the client to retrieve it. Alternatively, these two sites may be combined under one site that services both processes.

The system can be utilized between two or more different mobile communication devices at different locations. In this case, the mobile gateway receives the speech data from the first mobile communication device, and once processed by the mobile server, presents it to the second mobile communication device. It then, simultaneously, takes the speech data from the second mobile communication device and presents the output of the mobile server back to the first mobile communication device.

SMINDS Mobile Server

Figure 5:
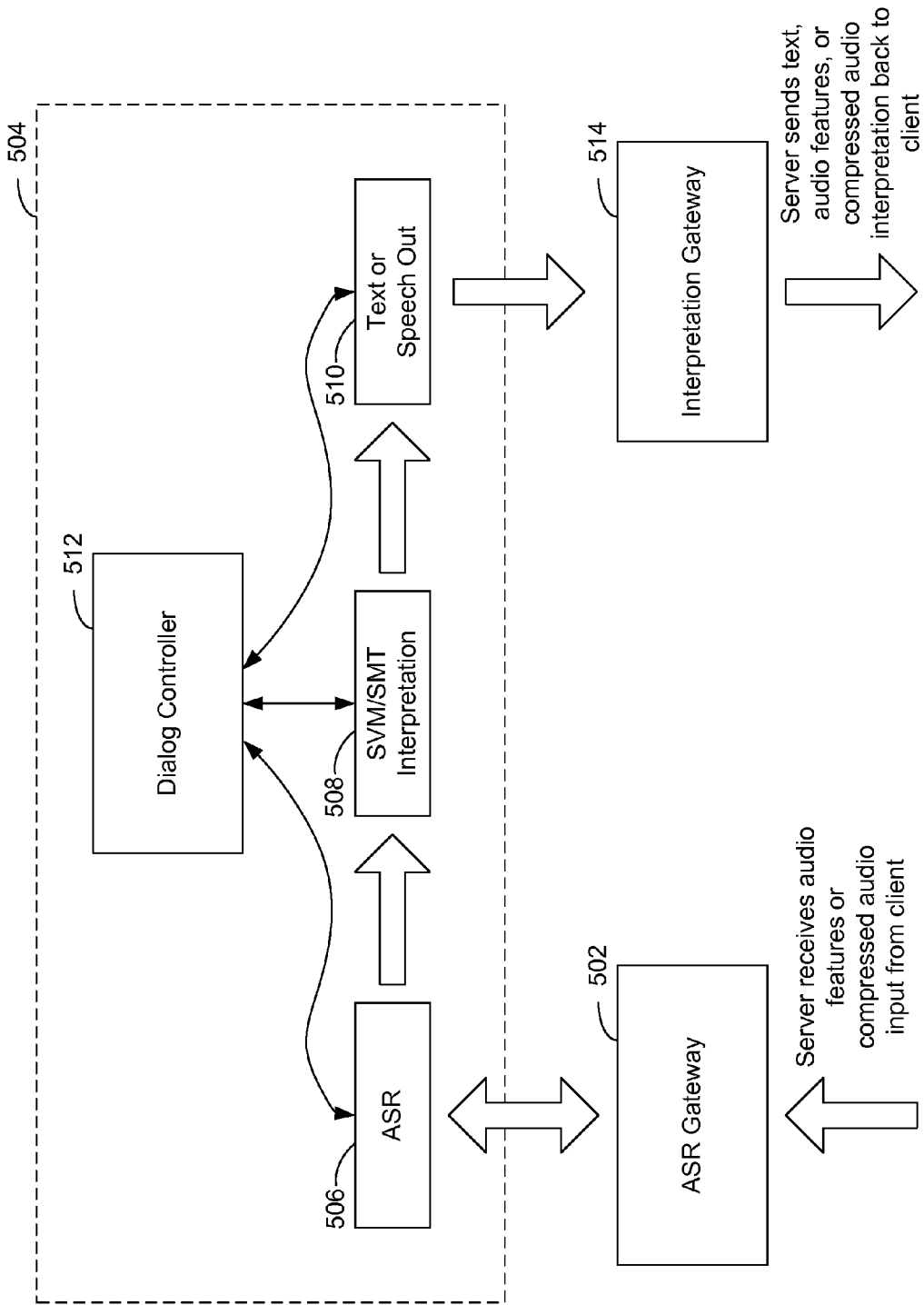
FIG. 5 illustrates a process with the SMINDS Mobile server of the present invention.

FIG. 5 illustrates the components of a SMINDS Mobile server. Speech data is retrieved from the client, through the gateway 502, to the server 504. The data is processed through the ASR module 506, the interpretation module 508, and the output processing module 510, wherein the process is controlled by a dialog controller 512. Finally, the data that is produced as a result of this interpretation is sent back to the client via an interpretation gateway 514.

Speech Recognition

After the server receives the speech data, it passes that data to a speech recognition module or modules. Recognition is achieved by means that include but are not limited to the use of grammars and statistical language models; the exact mixture and weighting of the two may be determined empirically.

A specific type of language model which may be used in this application is that of a mobile interference model. Mobile devices present new kinds of challenges for speech recognition due to a variety of issues, such as a loss of a signal or a weak signal. Modeling these errors, in addition to the user profile and domain, may improve recognition results.

Another method used in the speech recognition process is optimizing possible recognition results for interpretation by utilizing first word-recognition lattice results in conjunction with interpretation lattice results. In order to get the best possible interpretation, it is possible to use the first set of recognition results, in some combination of an n best list or a lattice, rescored using the results of their corresponding interpreted n best list or lattice (produced from the interpretation engine) to produce a set of second recognition results which are then re-passed to the interpretation engine.

Interpretation

Once the recognition result is acquired, the audio or text is interpreted by a Classification engine to derive the interpretation. These engines can classify the speech data into one of many bins (or in this case one of many interpretations) by utilizing linguistic and statistical information. The assumption is that each statement can be paraphrased by a specific concept for representating the information embedded in the result of an ASR engine.

The output of the interpretation engine may be the top one result or the top n results. All of the results are passed to the output processing module. Interpretation may be substituted or augmented by standard translation technology, such as RBMT, TBMT, and SMT, as outlined in a previously filed patent application (U.S. patent application Ser. No. 11/633, 859) or it may be perform in real time by a human.

The interpretation engine analyzes categorize and/or extract the abstract, conceptual information from the input into the form of an interlingua. An interlingua is an abstract language-independent representation. The conceptual interlingua result can then be mapped to any second language. Additionally, the interpretation engine may bypass the interlingua step by interpreting directly between languages using the methods above.

SMINDS Mobile can also utilize location information acquired through the mobile communication device to improve recognition and interpretation. The system will boost scores for recognition and interpretation results that contain named entities that are in close proximity to the user. For example, if the user is located in Barcelona, Spain asking for directions, the system will assume that it is more likely that the user will be using street names and landmarks in the vicinity rather than in the United States. If the user's position moves while using SMINDS Mobile, the location information will update and recalculate utterance probabilities accordingly.

The SMINDS server will pass the interpretation of the user's utterance to the output processing module to provide an audio, text, image, video representation of the interpretation(s).

Output Processing

Given one or n output text strings of the interpretation, the output processing module will produce a combination of text, audio, images or video representations (formats) of the text for each interpretation. This information along with the corresponding output of the recognizer (for verification purposes) is transmitted back to the client using the mobile gateway. An audio representation may be achieved by any of a number of methods including a speech synthesis engine (like those from Cepstral or Nuance Corporation), or by splicing recordings for words and phrases. The output can be sent simultaneously to multiple users each in its designated language and format.

The output may be displayed to the user in any spoken language via text, audio, images or video. The output can also be displayed in sign language. For example, the user, such as a nurse or pharmacist, may input spoken language, which the interpretation engine maps through an interlingua, to concepts in American Sign Language (ASL) or any other standard sign language employed by the hearing impaired. The Sign Language can then be displayed to the second user via still images or video. The output could also be displayed in multiple languages to multiple second users, such as a tour guide using the system to communicate with a large group of tourists. Each second user can select his or her own language and output format preferences, including ASL video.

SMINDS Mobile Interface

The SMINDS Mobile user interface may be multifaceted and customizable. It comprises multiple modes in both the graphical user interface (GUI) and the voice user interface (VUI). The GUI is made up of a single pane which can be customized to show various pieces of information to the user. The pane can display the domain, topics, status, verification, images, or video. The information in the pane can be accessed on a touch screen or keys on the mobile communication device.

The embodiments of the present invention may have multiple custom user interfaces for different domain usages, as well as a third interface used for development and testing of the system.

Figure 6:
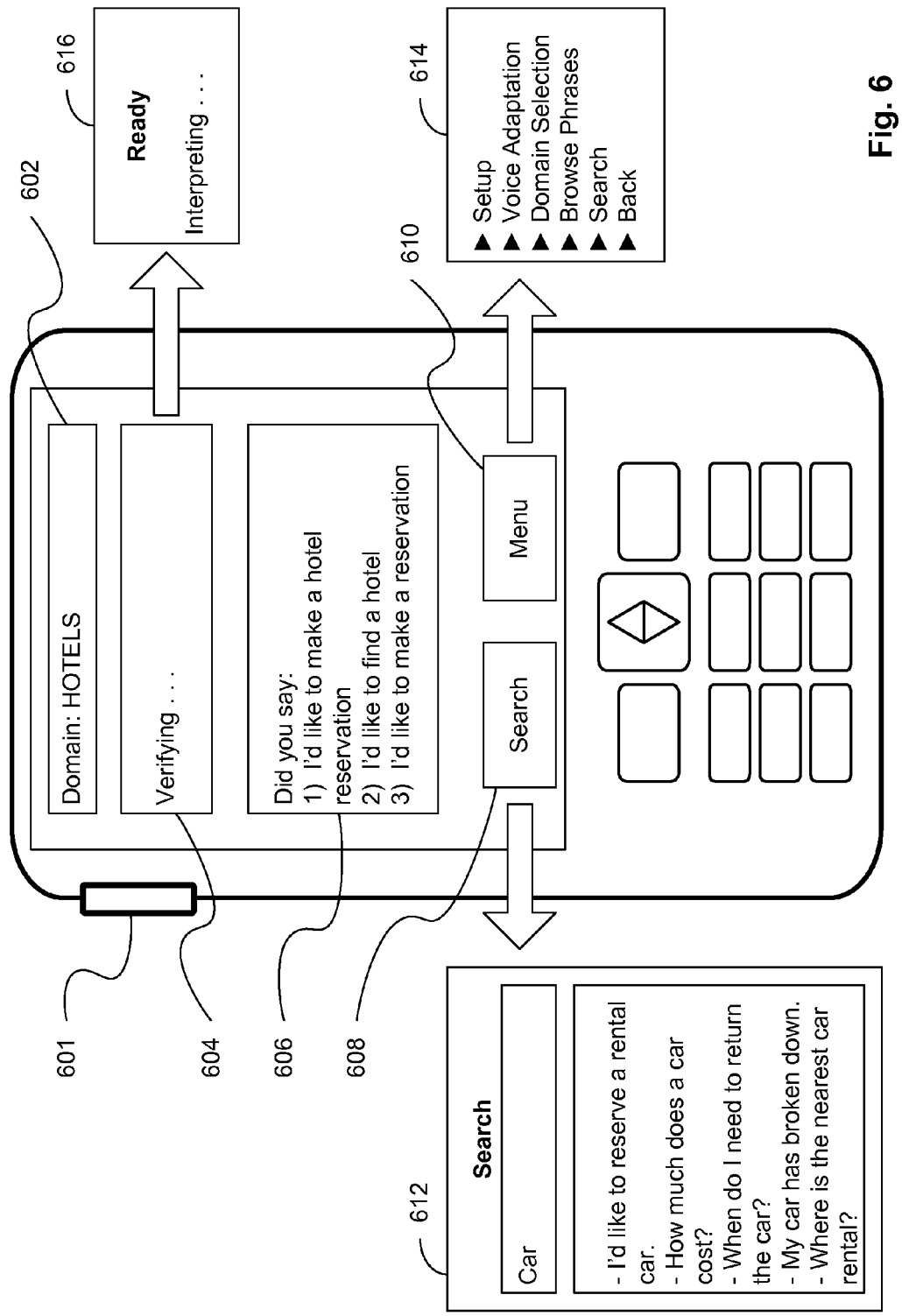
FIG. 6 illustrates one example of the SMINDS Mobile user interface.

FIG. 6 illustrates a sample GUI. A standard setup for SMINDS Mobile may display a domain button 602, a status button 604, a verification pane 606, a search button 608, and a menu button 610. An existing button 601 on a device running SMINDS Mobile can be set to initiate the interpretation system when pressed. The domain button 602 displays the current selected domain and allows the user to select other domains. The status button 604 displays the current status, either ready and waiting to initiate interpretation, interpreting (illustrated in 616), or verifying. The status button 604 may serve to activate and/or deactivate recognition and interpretation. Using the search button 608, a window can be displayed showing a navigable map of the concepts in the system and allowing the user to search through them by keywords or phrases 612. The user can then speak the phrase to be interpreted, or they can click the phrase to access immediate interpretation. Using the menu button 610 will allow the user to access a variety of other features in the system (illustrated in 614), including voice adaptation, as well as those listed above. Other custom interfaces and features can quickly be designed for any given user group or situation.

There is also the verification pane 606 which displays n best recognition results for the user to select prior to interpretation. The user also can reject all of the results and repeat their statement. In this way, the system accuracy can be improved. In the case that system is being utilized between two different mobile communication devices, the verification pane 606 will involve extra processing because the first mobile communication device still verifies the recognition results of what they said, but the interpretation (in the form of speech and/or text) is presented only to the second user.

Any of the above features can be used with voice commands and audio responses which comprise the SMINDS Mobile VUI of the present invention.

The user can start recognition in SMINDS Mobile by using an existing programmable button on the mobile communication device or via voice command. Once recognition is activated, the user may hear a prompt, and then they can speak a phrase, and push a button to stop recognition. Alternatively the system may deploy a client side or server side speech end-point detection system that would automatically stop the recognition process once the user stops speaking for a defined period of time. The interpretation of the utterance or a prompt will then be played through the speaker on the mobile communication device.

If the user is using SMINDS Mobile for a 2-way interaction, the recognition for the second language speaker can be activated by either a programmable button on the mobile communication device or a voice command. Again, the user may hear a prompt, then speak a phrase, push a button again to stop recognition. Alternatively, the system may deploy a speech end-point detection system as described above. The interpretation result from the second language speaker or a prompt will then be played through the speaker on the mobile communication device.

While the present invention has been described with reference to certain preferred embodiments or methods, it is to be understood that the present invention is not limited to such specific embodiments or methods. Rather, it is the inventor's contention that the invention be understood and construed in its broadest meaning as reflected by the following claims. Thus, these claims are to be understood as incorporating not only the preferred methods described herein but all those other and further alterations and modifications as would be apparent to those of ordinary skilled in the art.

We claim:

1. A communication device comprising:
 a language input device configured to detect a first language signal associated with a first language; and
 a recognition and interpretation engine coupled with the language input device and configured to:
  obtain the first language signal from the language input device;
  generate a first recognition result set from the first language signal according to at least one of a grammar and statistical language model of the first language, said language model comprising a mobile interference model;
  generate an improved recognition result set from the first recognition result set by rescoring the first recognition result set according to a domain-specific language model;
  generate at least one interpretation result from the improved recognition results set;
  map the at least one interpretation result to a second language representation of a second language; and
  cause an output device to present an output interpretation according to the second language derived from the second language representation.

2. The device of claim 1, wherein the output interpretation comprises at least one of the following data formats: text, audio, images, and video.

3. The device of claim 1, wherein the first language signal comprises an audio signal.

4. The device of claim 1, wherein the first language signal comprises a voice signal.

5. The device of claim 1, wherein the first language signal comprises a speech signal.

6. The device of claim 1, further comprising a mobile device that includes the language input device, and the recognition and interpretation engine.

7. The device of claim 1, wherein the output device comprises a second, different mobile device.

8. The device of claim 1, wherein the output device comprises a mobile communication device.

9. The device of claim 1, further comprising a server that includes the language input device and recognition and interpretation engine.

10. The device of claim 1, wherein the domain-specific language model includes an interpreted "n best list".

11. The device of claim 1, wherein the domain-specific language model represents a user reject list of at least some of the first recognition results.

12. The device of claim 1, wherein the domain-specific language model include an interpretation lattice result.

13. The device of claim 1, wherein the domain-specific language model includes a location.

14. The device of claim 1, wherein the interference model represents a model of at least one the following: a loss of the first language signal, a weak first language signal, a user profile, and a domain.

15. The device of claim 1, wherein the domain specific model is a user selectable domain.

16. The device of claim 1, wherein the language input device comprises a microphone.

17. The device of claim 1, wherein the domain-specific language model relates to a pharmacist.

18. The device of claim 1, wherein the domain-specific language model relates to a nurse.

19. The device of claim 1, wherein the domain-specific language model relates to a tour guide.

20. The device of claim 1, wherein the domain-specific language model relates to a sign language.

21. The device of claim 1, wherein the grammar and statistical language models comprise empirically determined mixtures and weightings.

22. The device of claim 1, wherein the second language representation comprises an language independent interlingua.

23. The device of claim 1, wherein the second language comprises a sign language.

* * * * *